April 16, 1963 L. H. WARRICK ETAL 3,085,751
WATER SPRINKLER
Filed May 19, 1961 3 Sheets-Sheet 1
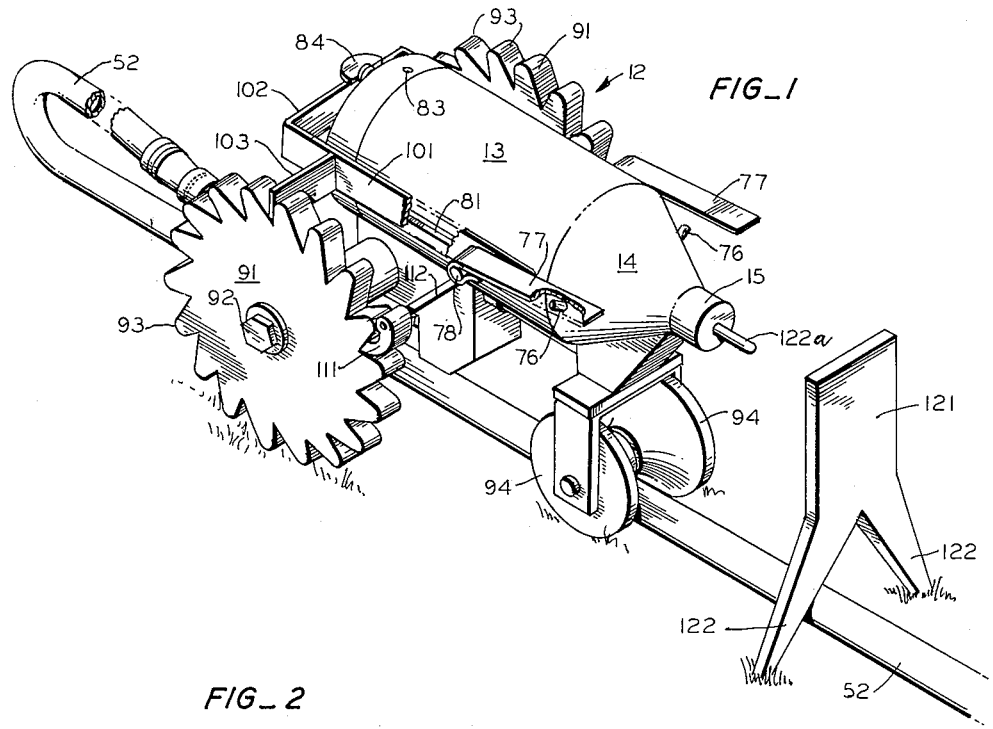
FIG_1
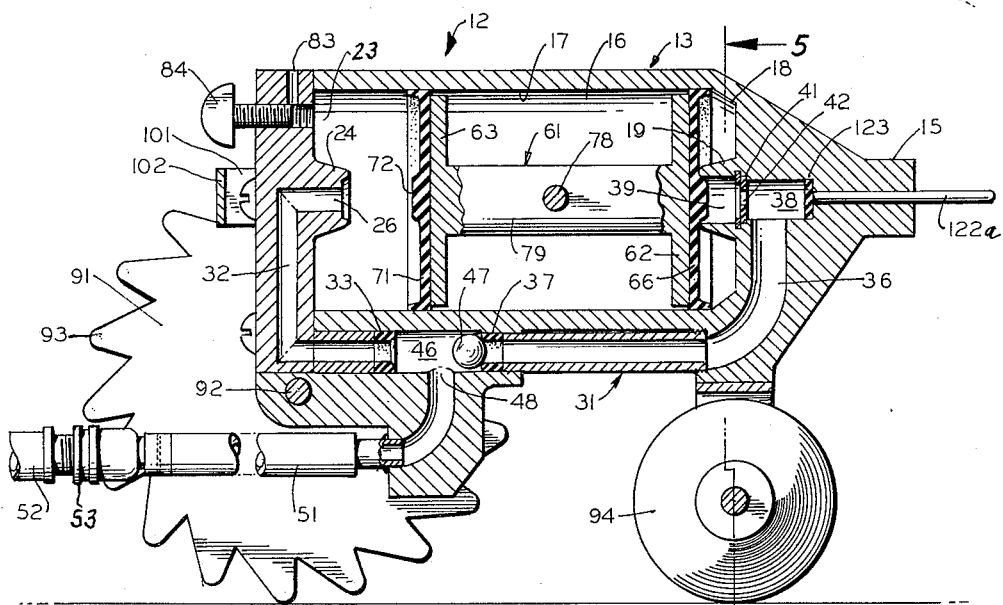
FIG_2
INVENTORS
LEON H. WARRICK
ALVIN L. LOY, SR.
BY Lothrop & West
ATTORNEYS April 16, 1963  L. H. WARRICK ETAL  3,085,751
WATER SPRINKLER
Filed May 19, 1961  3 Sheets-Sheet 2
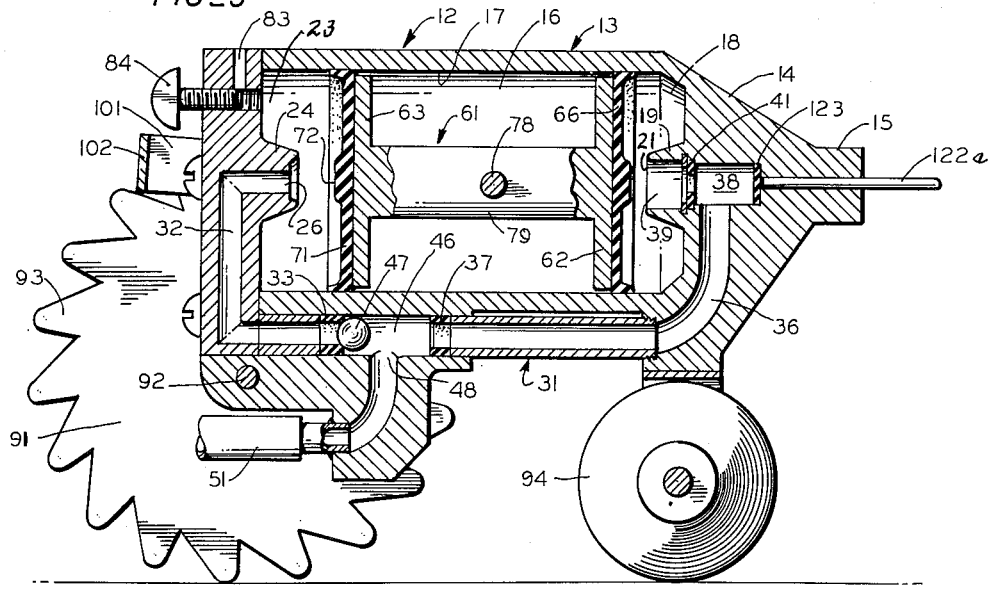
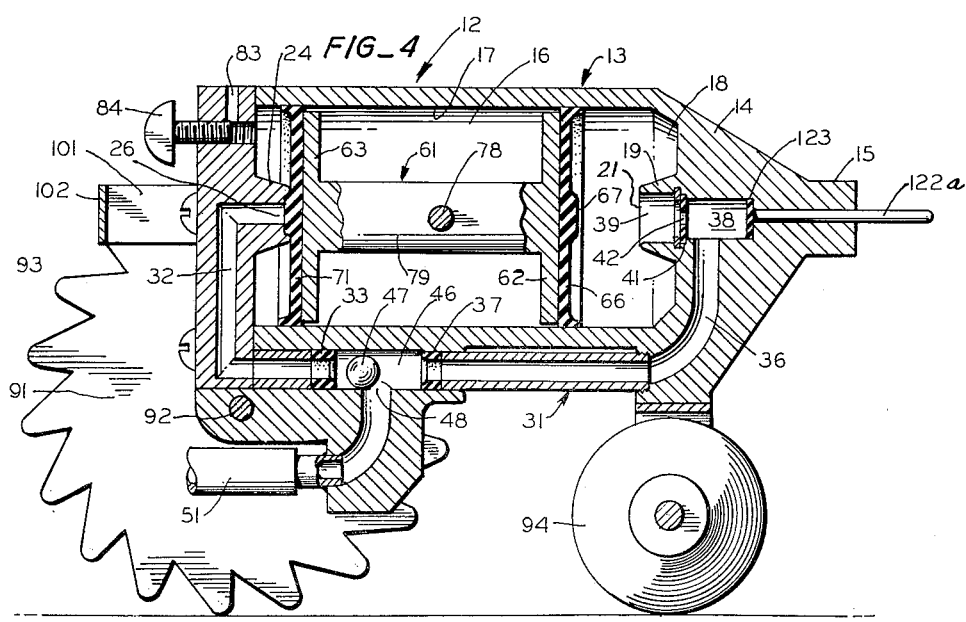
INVENTORS
LEON H. WARRICK
ALVIN L. LOY, SR.
BY Lothrop & West
ATTORNEYS

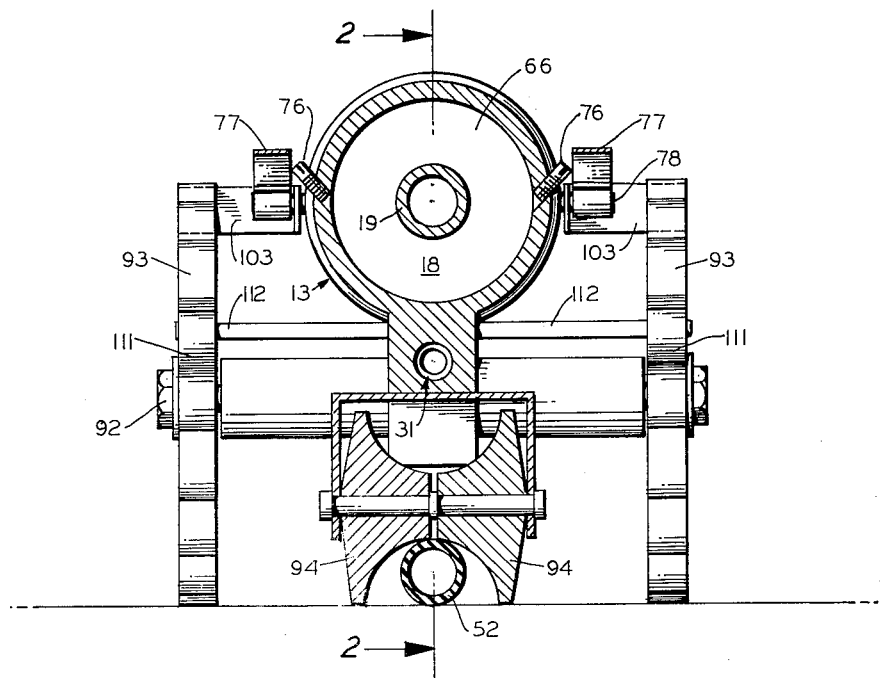

3,085,751
WATER SPRINKLER

Leon H. Warrick, 1016 Del Paso Blvd., North Sacramento, Calif., and Alvin L. Loy, Sr., 5113 Jackson St., North Highlands, Calif.
Filed May 19, 1961, Ser. No. 111,383
2 Claims. (Cl. 239—183)

The invention relates to sprinklers for watering lawns, flower beds, etc., and, more particularly, to sprinklers of the traveling type.

It is an object of the invention to provide a sprinkler which is capable of watering for long periods of time without any special attention.

It is another object of the invention to provide a sprinkler which covers a substantial area with a uniform amount of water.

It is a further object of the invention to provide a water sprinkler which can easily be regulated to provide many different spray patterns.

It is still a further object of the invention to provide a water sprinkler which has but few moving parts to get out of order and which is rugged and long lived.

It is yet another object of the invention to provide a traveling water sprinkler in which the path can be pre-set and in which the cut-off and stopping point can be pre-established.

It is another object of the invention to provide a generally improved water sprinkler.

Other objects, together with the foregoing, are attained in the embodiment described in the following description and shown in the accompanying drawings, in which:

FIGURE 1 is a perspective of the water sprinkler in a typical environment, with the sprinkler approaching the cut-off plate;

FIGURE 2 is a vertical, median, longitudinal section, showing the piston in forwardmost position;

FIGURE 3 is a view comparable to that of FIGURE 2 but with the piston in an intermediate position;

FIGURE 4 is comparable to FIGURES 2 and 3 but showing the piston in aftermost position; and FIGURE 5 is a transverse section, the plane of the section being indicated by the line 5—5 in FIGURE 2.

While the water sprinkler of the invention is susceptible of numerous physical embodiments, depending on the environment and requirements of use, substantial numbers of the herein shown and described embodiment have been made and used, and have performed in a very successful manner.

A water sprinkler of the invention, generally designated by the numeral 12, comprises an elongated circular cylindrical body 13 terminating forwardly in a conical nose portion 14 and a cylindrical head portion 15.

Suitably formed within the body is a cylindrical chamber 16 peripherally defined by a chamber wall 17. The forward end of the chamber 16 terminates in a forward annular cavity 18 centrally interrupted by a projecting annular ring 19 having a port 21 in communication with the forward portion of the chamber 16. In comparable fashion, the after end of the chamber 16 is provided with an after annular cavity 23 with an annular ring 24 and an after port 26.

Connecting with the forward port 21 and with the after port 26 is a passageway, generally designated by the numeral 31. The after portion 32 of the passageway extends from a resilient ball seat 33 to the after port 26 and the forward portion 36 of the passageway 31 extends from a forward ball seat 37 to a small cylindrical chamber 38 formed in the nose 14. Connecting the small chamber 38 to the port 21 is a cylindrical channel 39 and interposed between the chamber 38 and the channel 39 is a resilient annular ring 41 having a central port 42.

Located between the forward ball seat 37 and the after ball seat 33 is a ball chamber 46 having a ball 47 disposed therein and adapted to seat in the seats 37 and 33 under the urgency of water, under pressure, entering an opening 48 connecting with a conduit 51 adapted to be joined to a garden hose 52 by a conventional fitting 53.

Slidably disposed within the main cylindrical chamber 16 is a piston 61 having a forward head 62 and an after head 63. Mounted on the forward end of the forward head 62 is a forward gasket 66, or seal, the gasket 66 having a forwardly projecting central boss 67 adapted to seal off the port 21 in the forwardmost position of the piston, and as is shown most clearly in FIGURE 2.

A comparable after gasket 71, or seal, having a rearwardly projecting central boss 72 adapted to seal the rear port 26 (see FIGURE 4) is mounted on the rear end of the after piston head 63.

Connected to the forward annular cavity and leading outwardly to the atmosphere is a pair of nozzles 76 (see FIGURES 1 and 5). Located above each of the nozzles is an elongated deflector wing 77 mounted on a cross rod 78 extending transversely through the walls 17 of the body and mounted on the central web 79 of the piston. As the piston reciprocates, the rod 78 and, thus, both of the wings 77 move forwardly and backwardly. An elongated fore and aft slot 81 on each side of the body and extending through the wall 17 into the central portion of the chamber 16 accommodates and guides the cross rod 78 as reciprocation takes place.

Preferably, each of the wings 77 is frictionally mounted on the cross rod 78 so as to permit the user readily to incline the wing, about the rod 78 as a pivot, to any desired angle. With the wing 77 in a horizontal attitude, the water jet emanating from the nozzle 76 is subjected to a uniform deflecting force throughout the entire fore and aft stroke of the piston. With the forward end of the wing at a somewhat higher elevation than the cross rod 78, however, the water jet is deflected more downwardly when the piston is in forwardmost position than when it is in aftermost position. Furthermore, each of the wings is preferably fabricated from a metal, such as aluminum, which enables the user to bend or warp the wing somewhat so as to achieve the desired spray pattern in the event the desired pattern is not achieved with the wing 77 in a horizontal plane, as it is shown in FIGURE 5.

The after annular cavity 23 is connected to the atmosphere by a vent 83 whose opening is regulated by a screw 84. By rotating the screw 84 so as to cover the bottom of the vent 83, the sprinkler's operation is stopped. By fully uncovering the bottom of the vent 83, maximum speed is achieved. Intermediate speeds are attained by appropriate rotation of the screw 84 and the corresponding degree of opening of the bottom of the vent, the vent 83, and the screw 84 operating, in other words, as a speed regulating structure based on the principle of back pressure, as will be subsequently explained.

The body is supported at its after end by a pair of ground engaging wheels 91 each mounted on a cross shaft 92 and provided with a plurality of teeth 93. At its forward end, the body is supported by a rotatable split roller 94, or spool, adapted to overlie the garden hose 52 and to be guided thereby along the predetermined path established by the user.

Forward movement of the sprinkler along the pre-established path is effected by forwardly rotating the toothed wheels 91. Pivotally mounted on the cross rod 78 is a pair of rearwardly extending arms 101 joined at their rear end by a cross member 102. Projecting laterally outwardly from each of the arms 101 is a flange 103 adapted to engage with the teeth on the wheel 91. As the piston, the rod, the arm and the flange 103 move forwardly, the flange 103 pushes against one of the teeth and rotates the wheel in a forwardly moving direction. On the return (rearward) stroke of the piston, a pawl 111 pivotally mounted on a rod 112 extending outwardly from the body engages with the adjacent teeth, or ratchet teeth, as it were, and prevents reversal of the wheel. Concurrently, the arm 101, being pivotally mounted on the cross rod 78, swings upwardly, if necessary, to disengage from the teeth and to move backwardly preparatory to the ensuing forward stroke.

It is to be noted, incidentally, that the arms 101 and the cross member 102 serve in a very convenient fashion as a handle to lift and carry the device.

The operation of the sprinkler is as follows. Assuming that, as in FIGURE 2, the piston has just completed its forward stroke, the ball valve 47 is seated in the seat 37 and the forward boss 67 has sealed off the forward port 21, the only direction in which the water entering through the opening 48 can and does flow is through the valve seat 33, upwardly through the after port 26 and outwardly to the atmosphere through the vent 83.

At the same time, the water pressure on both sides of the seated ball 47 is substantially identical. Consequently, the ball 47 falls by gravity, and tubulence of the incoming flow, through the opening 48, away from the forward ball seat 37 and toward the opening 48. At this location, the ball is trapped in the established flow from the opening 48 through the after valve seat 33 and is substantially instantaneously lodged in the after valve seat 33. Since the pressure in back of the ball is less than the pressure of the incoming water, by virtue of the vent 83, the ball remains lodged in the after seat 33.

Thus, at this juncture, the water entering through the opening 48 directs itself through the forward seat 37, into the chamber 38, through the port 42 and into the channel 39 where it exerts force against the boss 67, urging the piston in a rearward direction.

As the piston moves rearwardly, water flows into the forward annular cavity and outwardly through the nozzles 76 so as to spray against the wings and be deflected toward the ground.

Concurrently, water displaced by the rearward movement of the piston is ejected through the vent 83.

The piston moves rearwardly and stops when the after gasket boss 72 comes into sealing engagement with the port 26, as appears most clearly in FIGURE 4.

At this juncture, the after annular cavity 23 is isolated from the inflow of water and the pressure on the opposite sides of the ball 47 is substantially equal.

In the meantime, a flow pattern has been established from the opening 48, through the seat 37, the passageway 36, the chamber 38 and through the openings 42 and 21, thence outwardly through the nozzles 76.

In this situation, the ball 47 fails away from the after seat 33 and is swept by the curernt against the forward seat 37. Forward flow of the water is thereby stopped, and flow toward the after side is commenced, pushing the piston forwardly. As this action occurs, water disposed in the space forward of the piston is ejected through the nozzles into the atmosphere.

Upon reaching the forward end of the chamber, the piston seals the port 21 and the cycle is completed.

In the manner described the piston reciprocates and water continues to flow through the nozzles and the vent in a substantially continuous fashion. The nozzles wet the ground on opposite sides of the device and the water emitted from the vent covers the ground adjacent the sprinkler.

When desired, the sprinkler can be stopped at any predetermined location. A stop plate 121 haivng a pair of legs 122 can be inserted in the ground at any desired position. A pin 122a projecting forwardly through the head portion 15 is provided with a resilient washer 123 at its after end, the washer 123 being located, during sprinkling, at the forward end of the small chamber 38. As the pin 122a abuts against the stop plate 121 the washer 123 is urged against the annular ring 41 and seals off the opening 42 and thus prevents further water flow therethrough and thus, in turn, halts any further cycles of operation.

In comparable fashion, and should the user so desire, operation of the sprinkler can be stopped by totally closing or throttling the opening at the lower end of the vent 83 by appropriate manipulation of the screw 84.

It can therefore be seen that a highly flexible, versatile and yet rugged water sprinkling device is provided.

What is claimed is:

1. A water sprinkler comprising:
   (a) an elongated horizontal body having formed therein an elongated cylindrical chamber and a passageway removed from said chamber and communicating at opposite ends with the ends of said chamber at a forward port and an after port;
   (b) a piston slidably disposed in said chamber, said piston having a forward head and an after head adapted alternately to cover said forward port and said after port;
   (c) a water tube connecting at an opening with said passageway intermediate the ends thereof;
   (d) means for alternately directing water from said tube through said forward port and said after port and into said chamber, said water directing means including a forward ball seat and an after ball seat each disposed in said passageway and on opposite sides of said opening, and a ball adapted to shuttle between said seats under the urgency of water entering said opening;
   (e) a vent connecting the after end of said chamber to the atmosphere and a nozzle connecting the forward end of said chamber to the atmosphere, said nozzle being isolated from said forward port in the forwardmost position of said piston, and said vent being isolated from said after port in the aftermost position of said piston;
   (f) a pair of ground engaging wheels supporting said body;
   (g) a cross rod mounted on said piston and projecting laterally through said body;
   (h) a water deflecting wing mounted on said rod and extending forwardly to overlie said nozzle whereby water emerging from said nozzle impinges on said wing in substantially all positions of said piston; and
   (i) means on said cross rod engagable with said wheels for urging said wheels in a forward direction as said piston moves from said aftermost toward said forwardmost position.

2. A water sprinkler comprising:
   (a) an elongated horizontal body having formed therein an elongated cylindrical chamber and a passageway removed from said chamber and communicating at opposite ends with the ends of said chamber at a forward port and an after port;
   (b) a piston slidably disposed in said chamber, said piston having a forward head and an after head adapted alternately to cover said forward port and said after port;
   (c) a water tube connecting at an opening with said passageway intermediate the ends thereof;
   (d) means for alternately directing water from said tube through said forward port and said after port and into said chamber, said water directing means including a forward ball seat and an after ball seat each disposed in said pasageway and on opposite sides of said opening, and a ball adapted to shuttle between said seats under the urgency of water entering said opening;
   (e) a vent connecting the after end of said chamber to the atmosphere and a nozzle connecting the forward end of said chamber to the atmosphere, said nozzle being isolated from said forward port in the forwardmost position of said piston, and said vent being isolated from said after port in the aftermost position of said piston;

(f) a pair of ground engaging wheels supporting said body;

(g) a cross rod mounted on said piston and projecting laterally through said body;

(h) a water deflecting wing mounted on said rod and extending forwradly to overlie said nozzle whereby water emerging from said nozzle impinges on said wing in substantially all positions of said piston; and (i) means on said cross rod engageable with said wheels for urging said wheels in a forward direction as said piston moves from said aftermost toward said forwardmost position, said wheel urging means including a transverse flange mounted on said cross rod movable into engagement with each of said wheels on the forward stroke of said piston and said rod.

References Cited in the file of this patent
UNITED STATES PATENTS

| | | |
|---|---|---|
| 1,223,246 | Bohnenkemper | Apr. 17, 1917 |
| 2,901,180 | Warrick et al. | Aug. 25, 1959 |